US009769688B2

(12) United States Patent
Li et al.

(10) Patent No.: US 9,769,688 B2
(45) Date of Patent: Sep. 19, 2017

(54) DEVICE AND METHOD FOR PROMPTING INFORMATION ABOUT WI-FI SIGNAL

(71) Applicant: Beijing Qihoo Technology Company Limited, Beijing (CN)

(72) Inventors: Tao Li, Beijing (CN); Xu Zhang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 45 days.

(21) Appl. No.: 14/780,430

(22) PCT Filed: Feb. 20, 2014

(86) PCT No.: PCT/CN2014/072341
§ 371 (c)(1),
(2) Date: Sep. 25, 2015

(87) PCT Pub. No.: WO2014/154069
PCT Pub. Date: Oct. 2, 2014

(65) Prior Publication Data
US 2016/0037367 A1 Feb. 4, 2016

(30) Foreign Application Priority Data

Mar. 25, 2013 (CN) .......................... 2013 1 0097744

(51) Int. Cl.
*H04W 24/08* (2009.01)
*H04W 12/02* (2009.01)
(Continued)

(52) U.S. Cl.
CPC ........... *H04W 24/08* (2013.01); *H04L 12/189* (2013.01); *H04W 12/02* (2013.01); *H04W 84/12* (2013.01)

(58) Field of Classification Search
CPC .............................. H04W 24/08; H04W 12/02
(Continued)

(56) References Cited

U.S. PATENT DOCUMENTS 8,117,273 B1 * 2/2012 Mathur ................. H04L 12/581
709/206
2005/0176420 A1 * 8/2005 Graves .................. H04W 48/16
455/424

(Continued)

FOREIGN PATENT DOCUMENTS

CN 101765057 6/2010
CN 102547695 7/2012
(Continued)

*Primary Examiner* — Ronald B Abelson
(74) *Attorney, Agent, or Firm* — Harness, Dickey & Pierce, P.L.C.

(57) ABSTRACT

Disclosed are a device and a method for prompting information about a Wi-Fi signal. The device includes: one or more non-transitory computer readable medium configured to store computer-executable instruction, at least one processor to execute a plurality of software modules configured to execute the computer-executable instruction to cause: receiving a notification message broadcast by an operating system of a terminal, determining whether the target Wi-Fi signal contains an unsafe factor by detecting attribute information of the target Wi-Fi signal when the notification message displays that an event relevant to a target Wi-Fi signal occurs in the current terminal, and displaying prompt information about the target Wi-Fi signal when the target Wi-Fi signal contains an unsafe factor, the prompt information being used for prompting about the unsafe factor contained in the Wi-Fi signal for overcoming the unsafe factor.

18 Claims, 3 Drawing Sheets

(51) Int. Cl.
*H04L 12/18* (2006.01)
*H04W 84/12* (2009.01)
(58) Field of Classification Search
USPC .......................................... 370/312
See application file for complete search history.

(56) References Cited

U.S. PATENT DOCUMENTS

2008/0052512 A1    2/2008  Stevens et al.
2015/0106889 A1*   4/2015  Sharabani ........... H04L 63/1416
                                                726/5

FOREIGN PATENT DOCUMENTS

CN    102843681    12/2012
CN    103167488     6/2013

* cited by examiner

DEVICE AND METHOD FOR PROMPTING INFORMATION ABOUT WI-FI SIGNAL

TECHNICAL FIELD

The present disclosure relates to the field of wireless communication technologies and particularly to a device and method for prompting information about a Wi-Fi signal.

BACKGROUND ART

People can communicate anytime and anywhere via mobile terminals along with the constant development of communication technologies. Initially they communicate generally through making calls, sending short messages, etc. by using the mobile terminals over mobile communication networks deployed by mobile communications operators. Although subscribers can also access the Internet over such mobile communication networks to obtain information in a larger number of forms over the Internet, they have to pay a considerable fee for traffic arising from the access. Thus the Wi-Fi technology has been developed for solving this problem. Wi-Fi is a technology by which personal computers, handheld devices (e.g., a Personal Digital Assistant (PDA), a handset, etc.), and other terminals are connected wirelessly with each other, and a terminal device supporting Wi-Fi can access the Internet by using a wireless signal transmitted by a wireless signal transmitting device nearby without resorting to the mobile communication networks as long as the terminal device can receive the wireless signal.

The Wi-Fi technology undoubtedly has offered a technical basis for all kinds of online application software to be applied on mobile terminals, but a security risk may occur in a practical application. For example, a subscriber accessing Networks using a Wi-Fi signal source provided by a provider may find that his or her account registered in an instant message tool has been embezzled, etc. Consequently, how to improve the security in use of the Wi-Fi signal has become a technical problem to be necessarily addressed by those skilled in the art.

SUMMARY OF THE INVENTION

In view of the aforesaid problem, the present disclosure is put forward to provide a method and device for prompting information about a Wi-Fi signal so as to overcome or at least partially address the aforesaid problem, thereby improving the security of a terminal user in accessing Networks via the Wi-Fi signal.

According to one aspect of the disclosure, there is provided a method for prompting information about a Wi-Fi signal, the method including:

receiving a notification message broadcast by an operating system of a terminal;

when the notification message displays that an event relevant to a target Wi-Fi signal occurs in the current terminal, determining whether the target Wi-Fi signal contains an unsafe factor by detecting attribute information of the target Wi-Fi signal; and if yes, displaying prompt information about the target Wi-Fi signal, the prompt information being used for prompting about the unsafe factor contained in the Wi-Fi signal and/or a means for overcoming the unsafe factor.

According to another aspect of the disclosure, there is provided a device for prompting information about a Wi-Fi signal, the device including:

a notification message receiving unit configured to receive a notification message broadcast by an operating system of a terminal;

an attribute detecting unit configured to, when the notification message displays that an event relevant to a target Wi-Fi signal occurs in the current terminal, determining whether the target Wi-Fi signal contains an unsafe factor by detecting attribute information of the target Wi-Fi signal; and an prompting unit configured to display prompt information about the target Wi-Fi signal if the target Wi-Fi signal contains an unsafe factor, the prompt information being used for prompting about the unsafe factor contained in the Wi-Fi signal and/or a means for overcoming the unsafe factor.

The method and device for prompting information about a Wi-Fi signal according to the embodiments of the disclosure can detect the attribute information of the Wi-Fi signal in the terminal, and if there is an unsafe factor, then display corresponding prompt information in the form of a text, etc. to the user, so as to prompt the user, thus improving the security of the terminal user in using the Wi-Fi signal for access to the network.

Above description is only a summary of the technical solutions of the present disclosure, and particular embodiments of the disclosure will be described below in order to enable the technical means of the disclosure to be understood more clearly and to be practiced in light of the content of the description, and in order to make the foregoing and other objects, features and advantages of the disclosure more apparent.

BRIEF DESCRIPTION OF DRAWINGS

By reading the detailed description of the preferably selected embodiments below, various other advantages and benefits become clear for a person of ordinary skill in the art. The drawings are only used for showing the purpose of preferred embodiments and are not intended to limit the present disclosure. And in the whole drawings, same drawing reference signs are used for representing the same components. In the drawings.

DETAILED DESCRIPTION OF THE INVENTION

Exemplary embodiments of the disclosure will be described below in further details with reference to the drawings. Although the exemplary embodiments of the disclosure are illustrated in the drawings, it shall be appreciated that the disclosure can be embodied in various forms but will not be limited to the embodiments described here. On the contrary, these embodiments are provided in order that the disclosure can be understood more thoroughly and the scope of the disclosure can be conveyed fully to those skilled in the art.

It should be firstly noted that the inventors have found in making the disclosure that a security issue may occur in use of a Wi-Fi signal for access to networks in the prior art because of the following reasons: Generally if a terminal accesses networks via a Wi-Fi signal, then the bandwidth of the Wi-Fi signal source will be occupied, so some private Wi-Fi signal sources are typically encrypted, that is, even if a terminal can search out the Wi-Fi signal, but the terminal cannot access networks via the Wi-Fi signal if the password thereof is not known. However, some merchants or the like may let Wi-Fi signals available to customers for the purposes of attracting customers. Such Wi-Fi signals tend not to be encrypted, so any terminal can access networks directly via the Wi-Fi signal to surf over networks, log in an email box system or an instant messaging system, etc. so long as it search out the corresponding Wi-Fi signal. As for a provider of the Wi-Fi signal, the terminal exchanges information with the Internet through a network device (e.g., a wireless router, etc.) of the provider, which means that all the information transmitted and received by the terminal user via the Wi-Fi signal will flow through the network device of the provider. At this time the provider of the Wi-Fi signal has an opportunity to intercept communication data of the terminal user and to obtain privacy, account information, and other sensitive data of the terminal user from the communication data. Of course, the majority of providers of Wi-Fi signals let their Wi-Fi signal available just for the purpose of attracting customers, so the data of the terminal user is safe normally. However, there are still some vicious individuals who may intercept the privacy or the sensitive data of the user by means of the above features, particularly as follows:

They provide users of terminals with Wi-Fi signals intentionally without setting any password, and if a terminal user unaware of the potential security risk searches out a Wi-Fi signal available without entering any password, then the user will typically access networks directly via the Wi-Fi signal, and his or her privacy or sensitive data might have been intercepted by the vicious individuals.

Of course, if a terminal user with some security knowledge finds a Wi-Fi signal which is not encrypted, then the user may be suspicious of the Wi-Fi signal. Accordingly some smarter tricks occur as follows: the vicious individual provides users of terminals with a Wi-Fi signal which is not encrypted, and sets the name of the Wi-Fi signal similar to the name of another Wi-Fi signal commonly recognized as safe (e.g., a Wi-Fi signal from a well-known coffee shop), thus the users of terminals will mistakenly believe that the Wi-Fi signal is safe.

Figure 1:
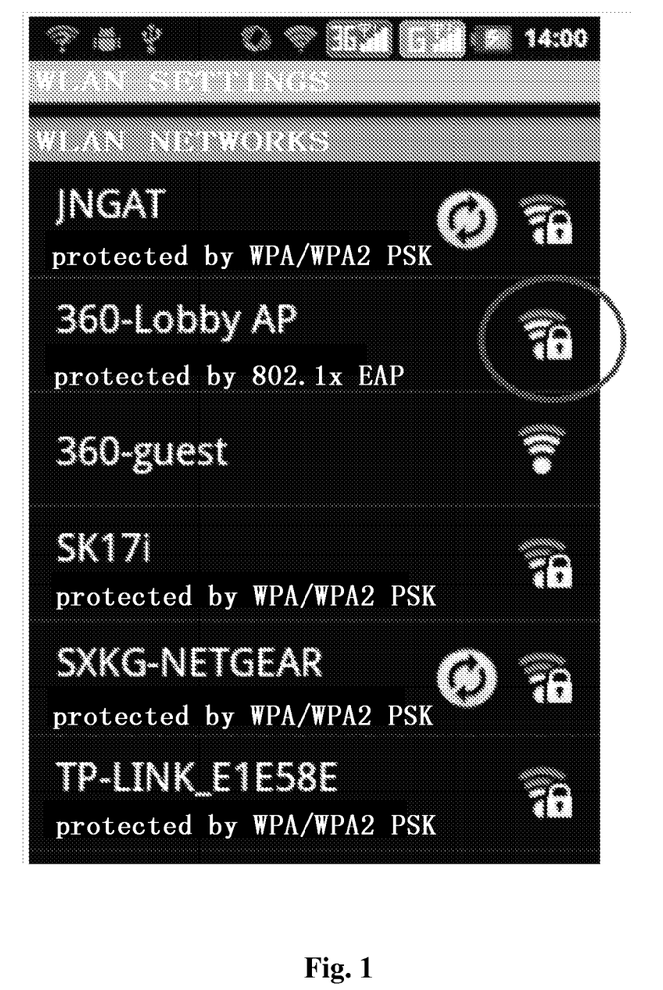
FIG. 1 illustrates a schematic diagram of a Wi-Fi signal interface displayed by an operating system in a terminal.

That is to say, if a Wi-Fi signal is not encrypted, then there may be an unsafe factor in the Wi-Fi signal; and if a Wi-Fi signal is not encrypted, and the name of the Wi-Fi signal is extremely similar to the name of another Wi-Fi signal which is commonly recognized as safe, then the Wi-Fi signal may also be unsafe at a high probability, so the users of terminals should be prompted. As for the above case, some attribute information of the Wi-Fi signal, including whether the Wi-Fi signal is encrypted, the name of the Wi-Fi signal, etc., may also be displayed according to the terminal, and the attribute information can function as prompts. Referring to FIG. 1, for example, FIG. 1 illustrates information about a plurality of Wi-Fi signals searched out by a terminal, wherein "JNGAT", "360-Lobby AP", "360-guest", "SK17i", "SXKG-NETGEAR", and "TP-LINK_E1E58E" are the names of the respective Wi-Fi signals, and the signal strength and whether the signal is encrypted are illustrated in the circle on the right side of the figure, and if there is a sign "Lock" on the icon of the signal strength, then it indicates that the signal is encrypted; or if there is no sign "Lock", then it indicates that the signal is not encrypted. For example, the Wi-Fi signal named "360-guest" in FIG. 1 is not encrypted. The terminal user can recognize from the attribute information whether the respective Wi-Fi signals are encrypted, and the user can find out the slight differences between the names by careful identification. However, if a terminal user lacks safety awareness, then such differences may be readily ignored, so that the privacy and the sensitive data of the terminal user may suffer from the risk of being intercepted.

Figure 2:
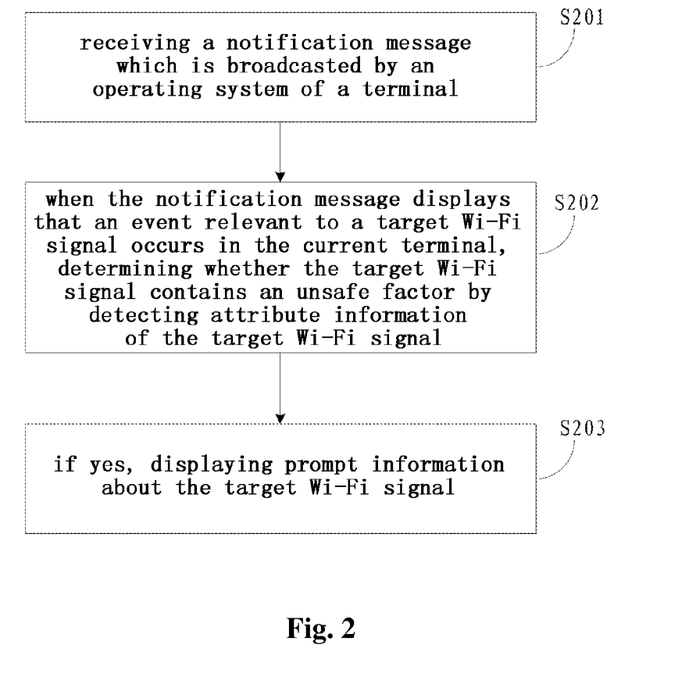
FIG. 2 illustrates a flow chart of a method according to an embodiment of the disclosure.

In view of this, an embodiment of the disclosure provides a method for prompting information about a Wi-Fi signal, and referring to FIG. 2, the method can include:

S201: receiving a notification message broadcast by an operating system of a terminal;

In particular implementation, the embodiment of the disclosure can provide an application which is run on an operating system of a terminal device to perform respective steps so as to execute corresponding operations, thereby achieving corresponding functions. An operating system of a terminal typically makes some interfaces available to applications which are run on the operating system so that the applications can obtain required information from the operating system. Therefore, in the embodiment of the disclosure, in order to receive the notification message of the operating system, the application according to the embodiment of the disclosure can be registered with the operating system of the terminal device, so that the application according to the embodiment of the disclosure can receive notification messages which are broadcast by the operating system to various applications.

S202: when the notification message displays that an event relevant to a Wi-Fi signal occurs in the current terminal, determining whether the Wi-Fi signal contains an unsafe factor by detecting attribute information of the Wi-Fi signal;

Here the event relevant to a Wi-Fi signal occurs in the current terminal can include the current terminal searching out a Wi-Fi signal or the current terminal accessing networks via a Wi-Fi signal, etc. That is to say, the detection operation can be performed on a plurality of occasions, one of which can be that the terminal just search out a Wi-Fi signal, and at this time attribute information of the Wi-Fi signal will be displayed in a list, and if the user does not select the Wi-Fi signal by clicking and so on, then the user will not access networks directly via the Wi-Fi signal. However, any Wi-Fi signal displayed in the list may possibly be clicked by the user, so the detection can be performed before the user clicks. Alternatively, the Wi-Fi signal can be displayed when the user clicks on an entry in the list to be ready for accessing networks via the Wi-Fi signal.

No matter whether searching out a Wi-Fi signal, or being ready for accessing networks via a Wi-Fi signal, an operating system of a terminal will broadcast a corresponding notification message, which can further carry attribute information of the Wi-Fi signal, e.g., the name of the Wi-Fi signal, whether the Wi-Fi signal needs to be encrypted, etc. Thus the application according to the embodiment of the disclosure can determine from the notification message broadcast by the system whether to detect the Wi-Fi signal for safety, and if yes, then the application can extract the attribute information of the Wi-Fi signal directly from the notification message to thereby perform the particular detection operation.

Whether there is an unsafe factor in a Wi-Fi signal can be determined particularly by determining directly from the attribute information of the Wi-Fi signal whether the Wi-Fi signal is encrypted, and if not, then determining that there is an unsafe factor in the Wi-Fi signal. Alternatively in order to avoid false determination, a white list can be further created based on Wi-Fi signals which are not encrypted but known as safe, and if it is found that a Wi-Fi signal is not encrypted, but the name of the Wi-Fi signal is in the white list, then no prompt will be made; or the user will be prompted that the Wi-Fi signal is safe and can be used without any worry, etc.

Moreover after a Wi-Fi signal is found not to be encrypted, the name thereof can be further compared with the names of the respective Wi-Fi signals in the white list, and if the name thereof is not found in the white list, but is extremely similar to the name of a Wi-Fi signal in the white list, then it can be determined that the Wi-Fi signal has two unsafe factors of being not encrypted and the name thereof being extremely similar to the name of another known Wi-Fi signal. Since there is a relatively high quantity of unsafe factors, the level of risk is high when a user accesses networks via the Wi-Fi signal.

If two Wi-Fi signals A and B not being encrypted are searched out, and the name of the Wi-Fi signal A is in the white list, whereas the name of the Wi-Fi signal B is not in the white list, but is extremely similar to the name of the Wi-Fi signal A, then it can also be determined that there are unsafe factors in the Wi-Fi signal B, including three unsafe factors of being not encrypted, the name thereof being extremely similar to the name of another known Wi-Fi signal, and the other Wi-Fi signal with the name similar thereto being also searched out by the current terminal device, so the probability of unsafe is very high, and the level of risk is very high when the user accesses networks via the Wi-Fi signal.

Moreover when a user accesses networks via a Wi-Fi signal, and find that the Wi-Fi signal is not safe, the user can report this to a server, and when receiving messages reported by a number of users regarding unsafe of the same Wi-Fi signal, the server can identify the Wi-Fi signal as unsafe. Thus the embodiment of the disclosure can further collect the feedbacks of the users through the server, and save a list according to the characteristics of the Wi-Fi signals (i.e., the names of Wi-Fi hotspots, etc.) fed back by the users, and if the number of users who make feedbacks for a certain Wi-Fi signal exceeds a threshold, then the user is prompted that the Wi-Fi signal may have an unsafe factor. In a particular implementation, a client can obtain, from the server, the information about the number of times of users reporting the current Wi-Fi signal, and if the number of times exceeds a certain threshold, then it is determined that the Wi-Fi signal has an unsafe factor.

S203: if yes, displaying prompt information about the Wi-Fi signal, the prompt information being used for prompting about the unsafe factor contained in the Wi-Fi signal and/or a means for overcoming the unsafe factor.

After a Wi-Fi signal possibly with an unsafe factor is detected, related prompt information can be displayed to the user. The prompt information can be displayed particularly in a number of ways. For example, the simplest way is to display "the Wi-Fi signal possibly has a risk" directly to alert the user for attention. Alternatively the prompt information can be displayed together with the particular unsafe factors, e.g., "the Wi-Fi signal is not encrypted and possibly has a risk", "the Wi-Fi signal is not encrypted, similar to the name of another Wi-Fi signal, and possibly has a risk", etc. Moreover how to overcome the unsafe factor can be further prompted, for example, prompting the user not to input or transmit sensitive information or to transmit such information by encrypting, etc. as necessary.

Moreover in a particular implementation, a high or low level of risk can be determined based on the quantity of unsafe factors of the Wi-Fi signal. For example, if it is found that a Wi-Fi signal is just not encrypted, but there is no a similar name to the name thereof in the white list, then the level of risk thereof is lower; if it is found that a Wi-Fi signal is not encrypted, and there is a similar name to the name thereof in the white list, then the level of risk thereof is higher; and if it is found that a Wi-Fi signal is not encrypted, there is a similar name to the name thereof in the white list, and the other Wi-Fi signal with the name similar to the name thereof in the white list is also searched out by the current terminal, then the level of risk thereof is further higher. The prompt information can be displayed particularly by setting different display attributes according to the high or low levels of risks. For example, the prompt information is display in yellow for a general level of risk, the prompt information is displayed in orange in a higher level of risk, and the prompt information is displayed in red in the highest level of risk; or a high or low level of risk is explicitly indicated directly in the form of a text, etc.

It should be noted that, as for the case in which "a Wi-Fi signal A is not encrypted, the name of Wi-Fi signal B similar to the name thereof is in the white list, and the Wi-Fi signal B is also searched out by the current terminal", at the same time that the level of risk of the Wi-Fi signal A is prompted to be very high, such prompt information can be further transmitted that suggests accessing networks via the Wi-Fi signal B since the Wi-Fi signal B is determined to be safe.

Moreover in a practical application, such a situation may arise that it has been determined that the current Wi-Fi signal has an unsafe factor, and the user has also been prompted, but the user may still transmit data via the Wi-Fi signal. At this time, in order to secure the data of the user, the client according to the embodiment of the disclosure firstly transmit the data of the user to a proxy server, and the proxy server can serve to relay and encrypt the data for safe. That is to say, all the data transmitted by the user can firstly be transmitted to the relay proxy server for transmission, and the transmission data can be encrypted with a prescribed secret key between the client and the proxy server, so that upon reception of the data the proxy server can firstly decrypt the data transmitted by the client, and then transmit the data to a destination address. If a server at the destination address needs to return data, then the data will firstly be transmitted to the proxy server and then further returned by the proxy server to the client of the user. Still furthermore the proxy server can be further controlled more strictly to receive the transmission data transmitted from the destination address to the client, and the proxy server can encrypt and then transmit the transmission data to the client, so that the client can receive and then decrypt automatically the data by using the prescribed secret key. In this way, data transmission can be in safe even if the Wi-Fi signal is not safe, thereby avoiding privacy data from being intercepted.

In conclusion, in the embodiment of the disclosure, the attribute information of the Wi-Fi signal can be detected in the terminal, and if there is an unsafe factor, then corresponding prompt information can be displayed to the user in the form of a text, etc., so that the user will notice it, thus improving the safety of the user of the terminal in use of the Wi-Fi signal for access to the network.

Figure 3:
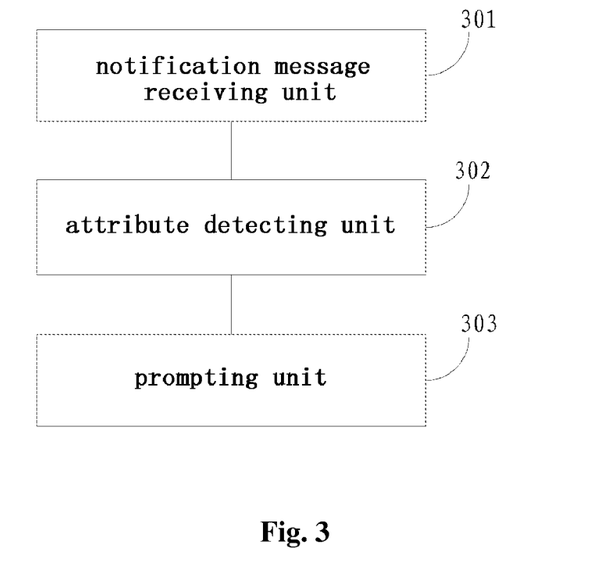
FIG. 3 illustrates a schematic diagram of a device according to an embodiment of the disclosure.

In correspondence to the method for prompting information about a Wi-Fi signal according to the embodiment of the disclosure, an embodiment of the disclosure further provides a device for prompting information about a Wi-Fi signal, and referring to FIG. 3, the device can include:

a notification message receiving unit 301 configured to receive a notification message broadcast by an operating system of a terminal;

an attribute detecting unit 302 configured to, when the notification message displays that an event relevant to a target Wi-Fi signal occurs in the current terminal, determine whether the target Wi-Fi signal contains an unsafe factor by detecting attribute information of the target Wi-Fi signal; and a prompting unit 303 configured to display prompt information about the target Wi-Fi signal if the target Wi-Fi signal contains an unsafe factor.

Here the event relevant to the target Wi-Fi signal occurs in the current terminal includes: the current terminal searches out a target Wi-Fi signal; or the current terminal is accessing networks via a target Wi-Fi signal.

In a particular implementation, the attribute detecting unit 302 can include:

a first detecting sub-unit configured to detect whether the target Wi-Fi signal is encrypted; and a first determining sub-unit configured to determine that the target Wi-Fi signal contains an unsafe factor if the target Wi-Fi signal is not encrypted.

In order to avoid false determination, the attribute detecting unit 302 can include:

a first detecting sub-unit configured to detect whether the target Wi-Fi signal is encrypted;

a second detecting sub-unit configured to determine whether the name of the target Wi-Fi signal is in a preset white list if the target Wi-Fi signal is not encrypted, the white list stores names of known safe Wi-Fi signals; and a second determining sub-unit configured to determine that the target Wi-Fi signal does not contain any unsafe factor if the name of the target Wi-Fi signal is in the white list.

Alternatively, the attribute detecting unit 302 can include:

a first detecting sub-unit configured to detect whether the target Wi-Fi signal is encrypted;

a third detecting sub-unit configured to determine whether the similarity between the name of the target Wi-Fi signal and the name of a certain known safe Wi-Fi signal in the preset white list reaches a preset threshold if the target Wi-Fi signal is not encrypted; and if yes, then determine that the target Wi-Fi signal has an unsafe factor.

Further alternatively, the attribute detecting unit 302 can include:

a first detecting sub-unit configured to detect whether the target Wi-Fi signal is encrypted;

a third detecting sub-unit configured to determine whether the similarity between the name of the target Wi-Fi signal and the name of a certain known safe Wi-Fi signal in the preset white list reaches a preset threshold if the target Wi-Fi signal is not encrypted;

if yes, then determine whether the known safe Wi-Fi signal is also searched out by the current terminal; and if yes, then determine that the target Wi-Fi signal contains an unsafe factor.

In the above case, the device can further include:

a suggestion information prompting unit configured to display prompt information that suggests accessing networks via the known safe Wi-Fi signal.

Moreover the attribute detecting unit 302 can include:

a user quantity obtaining sub-unit configured to obtain, from a server, the number of times detected by the server that users report that the target Wi-Fi signal is not safe; and a fifth determining sub-unit configured to determine that the target Wi-Fi signal contains an unsafe factor if the number of times reaches a preset threshold.

In a particular implementation, the prompting unit 303 can be particularly configured to:

display the detected unsafe factor as the prompt information.

Alternatively, the device can further include:

a risk level determining unit configured to determine a level of risk of the Wi-Fi signal based on the quantity of detected unsafe factors; and the prompting unit 303 can be particularly configured to:

display the prompt information with a different display attribute based on a varying high or low level of risk.

In a practical application, such a situation may arise that it has been determined that the current Wi-Fi signal has an unsafe factor, and the user has also been prompted, but the user may still transmit data via the Wi-Fi signal. At this time, in order to secure the data of the user, the device can further include:

a data capturing unit configured for the terminal to capture first data information transmitted by the user via the Wi-Fi signal with the unsafe factor;

a first data encrypting unit configured for the terminal to encrypt and then transmit the captured first data information to a preset proxy server; and a first data decrypting unit configured for the proxy server to decrypt and then transmit the first data information, transmitted by the user, to a destination address.

Furthermore the device can further include:

a second data encrypting unit configured for the preset proxy server to receive second data information that is fed back by the destination address for the first data information, and to encrypt and then transmit the fed-back second data information to the terminal; and a second data decrypting unit configured for the terminal to receive and then decrypt the data information returned by the proxy server, and to process the second data information obtained by decrypting as a feedback result of the first data information.

In conclusion, in the embodiments of the disclosure the attribute information of the Wi-Fi signal can be detected in the terminal, and if there is an unsafe factor, then the corresponding prompt information can be displayed to the user in the form of a text, etc., so that the user will notice it, thus improving the security of the terminal user in use of the Wi-Fi signal for access to the networks.

The algorithms and displays provided here are not inherently related with any specific computer, virtual system or other equipments. Various general systems can be used together with teachings based on this. On the basis of the foregoing description, it is obvious to construct a structure as required by this kind of system. In addition, the present disclosure is not directed at any specific programming language. It should be understood that various programming languages can be used for realizing the content of the disclosure described here, and that the forgoing description of a specific language is for disclosing the optimal embodiment of the disclosure.

The description provided here has illustrated a lot of specific details. However, it should be understood that the embodiments of the disclosure can be practiced without these specific details. In some embodiments, the well-known methods, structures and techniques are not illustrated in detail, so that the description will not be obscure to be understood.

Similarly, it should be understood that in order to make the disclosure brief and help to understand one or more of the various aspects of the disclosure, the various features of the disclosure, in the aforesaid description of illustrative embodiments of the present disclosure, are sometimes grouped into a single embodiment, drawing, or description thereof. However, the disclosed method should not be explained as reflecting the following intention: i.e. the present disclosure sought for protection claims more features than the features clearly defined in any claim. To put more precisely, as is reflected in the following claims, the aspects of the disclosure contains less features than all the features of a single embodiment disclosed hereinbefore. Therefore, the claims complying with a specific embodiment are explicitly incorporated into the specific embodiment, wherein every claim itself acts as an individual embodiment of the disclosure.

Those skilled in the art can understand that adaptive changes can be made to the modules of the devices in the embodiment and the modules can be installed in one or more devices different from the embodiment. The modules or units or elements in the embodiment can be combined into one module or unit or element, and furthermore, they can be separated into more sub-modules or sub-units or sub-elements. Except that at least some of these features and/or process or unit are exclusive to each other, any combinations can be adopted to combine all the features disclosed by the description (including the attached claims, abstract and drawings) and any method or all process of the device or unit disclosed as such. Unless there is explicit statement, every feature disclosed by the present description (including the attached claims, abstract and drawings) can be replaced by substitute feature providing the same, equivalent or similar purpose.

In addition, a person skilled in the art can understand that although some embodiments described here comprise some features instead of other features included in other embodiments, the combination of features of different embodiments are deemed as falling into the scope of the present disclosure and forming different embodiments. For example, in the following claims, any one of the embodiments sought for protection can be used in various combination modes.

The various components embodiments of the present disclosure can be realized by hardware, or realized by software modules running on one or more processors, or realized by combination thereof. A person skilled in the art should understand that microprocessor or digital signal processor (DSP) can be used for realizing some or all functions of some or all components of the devices for presenting relevant information of accessed website according to the embodiments in the present disclosure in practice. The present disclosure can also realize one part of or all devices or programs (for example, computer programs and computer program products) used for carrying out the method described here. Such programs for realizing the present disclosure can be stored in computer readable medium, or can possess one or more forms of signal. Such signals can be downloaded from the Internet website or be provided at signal carriers, or be provided in any other forms.

Figure 4:
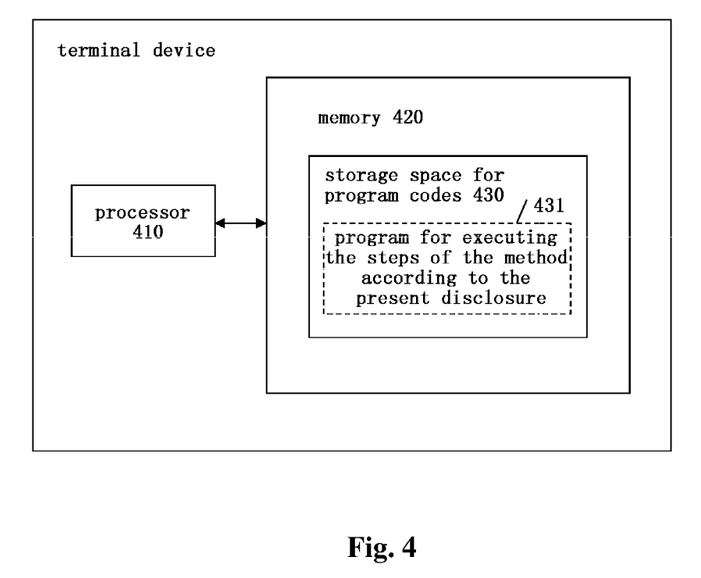
FIG. 4 illustrates a block diagram of a terminal device for executing the method according to the disclosure.
Figure 5:
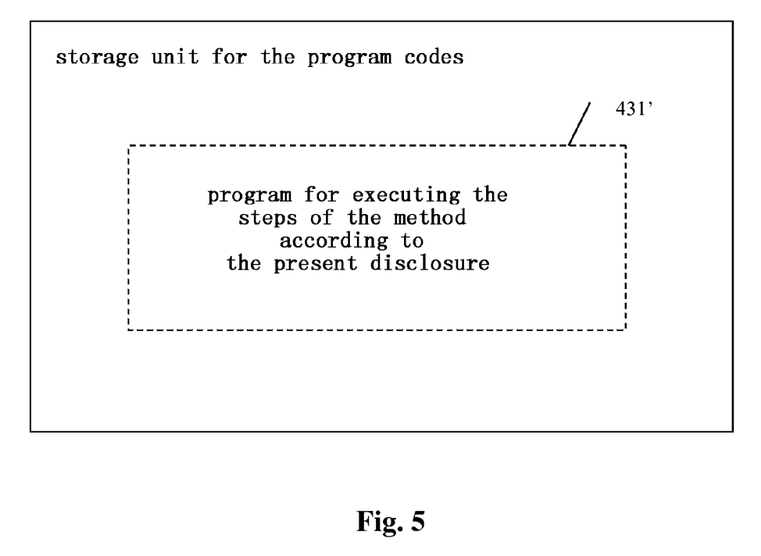
FIG. 5 illustrates a schematic diagram of a storage unit for holding or carrying program codes to execute the method according to the disclosure.

For example, FIG. 4 illustrates a terminal device which can realize the method for prompting information about a Wi-Fi signal according to the disclosure. The terminal device traditionally includes a processor 410 and a computer program product or a computer readable medium in the form of a memory 420. The memory 420 can be an electronic memory such as a flash memory, an Electrically Erasable Programmable Read Only Memory (EEPROM), an EPROM, a hard disk or an ROM. The memory 420 is provided with a storage space 430 for program codes 431 to execute any of the steps in the above method. For example, the storage space 430 for the program codes can contain respective program codes 431 for realizing the respective steps in the above method respectively. These program codes can be read from or written into one or more computer program products including a program code carrier such as a hard disk, a Compact Disk (CD), a memory card or a floppy disk. Such computer program product or products is or are typically a portable or fixed storage unit as illustrated in FIG. 5. The storage unit can be provided with storage segments or a storage space, etc. arranged similarly to the memory 420 in the terminal device illustrated in FIG. 4. For example, the program codes can be compressed in an appropriate form. Typically the storage unit contains program 431' for executing the steps of the method according to the present disclosure, i.e., codes which can be read by a processor such as 410, and which upon being executed by the terminal device cause the terminal device to execute the respective steps in the method described above.

It should be noticed that the forgoing embodiments are intended to illustrate the present disclosure and are not for limiting this disclosure, and a person skilled in the art can design substitute embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude the existence of a plurality of such elements. The present disclosure can be realized by means of hardware comprising several different elements and by means of properly programmed computer. In the unit claims listing several devices, several of the devices can be embodied by a same hardware item. The use of words first, second and third does not mean any sequence. These words can be explained as name.

What is claimed is:

1. A device for prompting information about a Wi-Fi signal, the device comprising:
   one or more non-transitory computer readable media configured to store computer-executable instructions; and
   at least one processor to execute a plurality of software modules configured to execute the computer-executable instructions to cause;
   receiving a notification message broadcast by an operating system of a terminal;
   when the notification message displays that an event relevant to a target Wi-Fi signal occurs in the current terminal, determining whether the target Wi-Fi signal contains an unsafe factor by detecting attribute information of the target Wi-Fi signal; and
   displaying prompt information about the target Wi-Fi signal when the target Wi-Fi signal contains the unsafe factor, the prompt information used for prompting about the unsafe factor contained in the Wi-Fi signal and/or a means for overcoming the unsafe factor;
   wherein the event relevant to the target Wi-Fi signal occurring in the current terminal includes:
   the current terminal searching out the target Wi-Fi signal; or the current terminal accessing networks via the target Wi-Fi signal.

2. The device according to claim 1, wherein the processor executes at least one of the software modules configured to execute the computer-executable instructions to cause:
  detecting whether the target Wi-Fi signal is encrypted; and
  determining that the target Wi-Fi signal contains an unsafe factor if the target Wi-Fi signal is not encrypted.

3. The device according to claim 1, wherein the processor executes at least one of the software modules configured to execute the computer-executable instructions to cause:
  detecting whether the target Wi-Fi signal is encrypted;
  determining whether the name of the target Wi-Fi signal is in a preset white list if the target Wi-Fi signal is not encrypted, the white list storing names of known safe Wi-Fi signals; and
  determining that the target Wi-Fi signal does not contain any unsafe factor if the name of the target Wi-Fi signal is in the white list.

4. The device according to claim 1, wherein the processor executes at least one of the software modules configured to execute the computer-executable instructions to cause:
  detecting whether the target Wi-Fi signal is encrypted;
  determining whether the similarity between the name of the target Wi-Fi signal and the name of a certain known safe Wi-Fi signal in a preset white list reaches a preset threshold if the target Wi-Fi signal is not encrypted; and
  if yes, then determining that the target Wi-Fi signal contains an unsafe factor.

5. The device according to claim 1, wherein the processor executes at least one of the software modules configured to execute the computer-executable instructions to cause:
  detecting whether the target Wi-Fi signal is encrypted;
  determining whether the similarity between the name of the target Wi-Fi signal and the name of a certain known safe Wi-Fi signal in a preset white list reaches a preset threshold if the target Wi-Fi signal is not encrypted;
  if yes, then determining whether the known safe Wi-Fi signal is also searched out by the current terminal; and
  if yes, then determining that the target Wi-Fi signal contains an unsafe factor.

6. The device according to claim 1, wherein the processor executes at least one of the software modules configured to execute the computer-executable instructions to cause:
  obtaining, from a server, the number of times detected by the server that users report that the target Wi-Fi signal is not safe; and
  determining that the target Wi-Fi signal contains an unsafe factor if the number of times reaches a preset threshold.

7. The device according to claim 1, wherein the processor further executes one or more software modules configured to execute the computer-executable instructions to cause:
  capturing first data information transmitted, at the terminal, by the user via the Wi-Fi signal with the unsafe factor;
  encrypting and then transmitting, at the terminal, the captured first data information to a preset proxy server; and
  decrypting and then transmitting, at the proxy server, the first data information, transmitted by the user, to a destination address.

8. The device according to claim 7, wherein the processor further executes one or more software modules configured to execute the computer-executable instructions to cause:
  receiving at the preset proxy server, second data information that is fed back by the destination address for the first data information, and encrypting and then transmitting the fed-back second data information to the terminal; and
  receiving and then decrypting, at the terminal, the second data information returned by the proxy server, and processing the second data information obtained by decrypting as a feedback result of the first data information.

9. A non-transitory computer readable recording medium, having instructions stored thereon that, when executed by at least one processor, cause the at least one processor to perform operations for prompting information about a Wi-Fi signal, which comprise the steps of:
  receiving a notification message which is broadcast by an operating system of a terminal;
  when the notification message displays that an event relevant to a target Wi-Fi signal occurs in the current terminal, determining whether the target Wi-Fi signal contains an unsafe factor by detecting attribute information of the target Wi-Fi signal; and
  if yes, displaying prompt information about the target Wi-Fi signal, the prompt information used for prompting about the unsafe factor contained in the Wi-Fi signal and/or a means for overcoming the unsafe factor;
  wherein the event relevant to the target Wi-Fi signal occurring in the current terminal includes:
  the current terminal searching out a target Wi-Fi signal; or
  the current terminal accessing networks via the target Wi-Fi signal.

10. A method for prompting information about a Wi-Fi signal, the method comprising:
  receiving a notification message broadcast by an operating system of a terminal;
  when the notification message displays that an event relevant to a target Wi-Fi signal occurs in the current terminal, determining whether the target Wi-Fi signal contains an unsafe factor by detecting attribute information of the target Wi-Fi signal; and
  if yes, displaying prompt information about the target Wi-Fi signal, the prompt information used for prompting about the unsafe factor contained in the Wi-Fi signal and/or a means for overcoming the unsafe factor;
  wherein the event relevant to the target Wi-Fi signal occurring in the current terminal includes:
  the current terminal searching out target Wi-Fi signal or
  the current terminal accessing networks via the target Wi-Fi signal.

11. The method according to claim 10, wherein determining whether the target Wi-Fi signal contains an unsafe factor by detecting attribute information of the target Wi-Fi signal comprises:
  detecting whether the target Wi-Fi signal is encrypted; and
  determining that the target Wi-Fi signal contains an unsafe factor if the target Wi-Fi signal is not encrypted.

12. The method according to claim 10, wherein determining whether the target Wi-Fi signal contains an unsafe factor by detecting attribute information of the target Wi-Fi signal comprises:
  detecting whether the target Wi-Fi signal is encrypted;
  determining whether the name of the target Wi-Fi signal is in a preset white list if the target Wi-Fi signal is not encrypted, the white list storing names of known safe Wi-Fi signals; and determining that the target Wi-Fi signal does not contain any unsafe factor if the name of the target Wi-Fi signal is in the white list.

13. The method according to claim 10, wherein determining whether the target Wi-Fi signal contains an unsafe factor by detecting attribute information of the target Wi-Fi signal comprises:
   detecting whether the target Wi-Fi signal is encrypted;
   determining whether the similarity between the name of the target Wi-Fi signal and the name of a known safe Wi-Fi signal in a preset white list reaches a preset threshold if the target Wi-Fi signal is not encrypted; and
   if yes, then determining that the target Wi-Fi signal contains an unsafe factor.

14. The method according to claim 10, wherein determining whether the target Wi-Fi signal contains an unsafe factor by detecting attribute information of the target Wi-Fi signal comprises:
   detecting whether the target Wi-Fi signal is encrypted;
   determining whether the similarity between the name of the target Wi-Fi signal and the name of a known safe Wi-Fi signal in a preset white list reaches a preset threshold if the target Wi-Fi signal is not encrypted;
   if yes, then determining whether the known safe Wi-Fi signal is also searched out by the current terminal; and
   if yes, then determining that the target Wi-Fi signal contains an unsafe factor.

15. The method according to claim 10, wherein determining whether the target Wi-Fi signal contains an unsafe factor by detecting attribute information of the target Wi-Fi signal comprises:
   obtaining, from a server, the number of times detected by the server that users report that the target Wi-Fi signal is not safe; and
   determining that the target Wi-Fi signal contains an unsafe factor if the number of times reaches a preset threshold.

16. The method according to claim 10, further comprising:
   determining a level of risk of the Wi-Fi signal according to the quantity of detected unsafe factors;
   wherein displaying prompt information about the target Wi-Fi signal comprises:
   displaying the prompt information with a different display attribute based on a varying high or low level of risk.

17. The method according to claim 10, further comprising:
   capturing, by the terminal, first data information transmitted by a user via the Wi-Fi signal with the unsafe factor;
   encrypting and then transmitting, by the terminal, the captured first data information to a preset proxy server; and
   decrypting and then transmitting, by the proxy server, the first data information, transmitted by the user, to a destination address.

18. The method according to claim 17, further comprising:
   receiving, by the preset proxy server, second data information fed back by the destination address for the first data information, and encrypting and then transmitting the fed-back second data information to the terminal; and
   receiving and then decrypting, by the terminal, the second data information returned by the proxy server, and processing the second data information, obtained by decrypting, as a feedback result of the first data information.

* * * * *